Aug. 2, 1932.  E. DIETZE  1,870,040
PIPE UNION HOUSING
Filed May 23, 1931
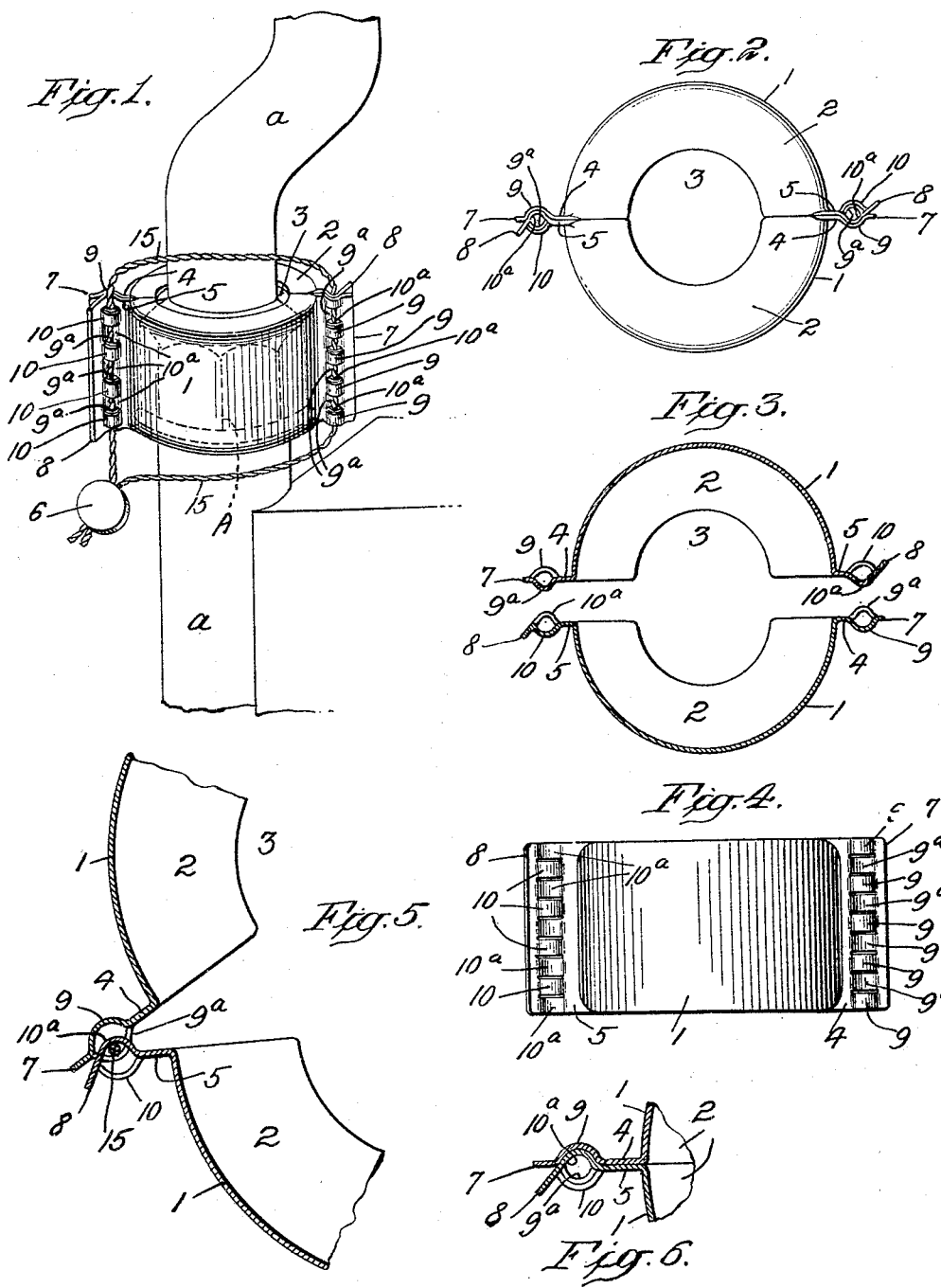

Patented Aug. 2, 1932

1,870,040

UNITED STATES PATENT OFFICE

EMIL DIETZE, OF RICHMOND HILL, NEW YORK, ASSIGNOR TO AMERICAN CASTING AND MANUFACTURING CORPORATION, OF BROOKLYN, NEW YORK, A CORPORATION OF NEW YORK

PIPE UNION HOUSING

Application filed May 23, 1931. Serial No. 539,433.

My present invention refers to certain new and useful improvements in pipe union housings or protecting devices for preventing the unscrewing of nuts, or the separation or dissociation of the parts of pipe couplings, especially those pipe unions used with gas and other fluid or liquid pipes; and it includes primarily a novel and improved form of housing or casing consisting of a plurality of sections and adapted to encircle or enclose the nut or coupling. When the sections are interengaged or wired together, and the wire ends are mutually fastened by a suitable seal or protecting device, access cannot be had to the nut or pipe coupling without breaking the seal.

My chief object is to enable the housing to be so made that it can be effectually sealed, and more quickly and easily applied than others now in use. And the invention consists particularly in the form and construction of the semicylindrical sections which go to compose the pipe-union-enclosing casing or housing, and especially the formation of the engageable flanged ends of the sections whereby these ends are united and prepared for sealing; and also the invention involves the construction, combination and arrangement of parts, and numerous details and peculiarities thereof, substantially as will be hereinafter described and claimed.

In the accompanying drawing illustrating my invention,

Figure 1 is a side elevation of a pipe coupling having my improved protecting device applied in connection therewith.

Figure 2 is a top plan edge view of my improved protecting housing with the sections united.

Figure 3 is a horizontal sectional plan view of the same with the sections disunited and separated from each other.

Figure 4 is a side elevation of one of the duplicate sections.

Figure 5 is an enlarged parted detail view of the two flanged sections and shows the engagement of two flanges and the wire therewith which gives a hinge effect to permit the opening of the two sections from each other.

Figure 6 is a similar detail sectional view showing the position of the same parts when the sections are closed together.

The housing device of my present improved protector for couplings, nuts, etc., is in the form of a casing adapted to cover or enclose the nut or other members, the removal of which it is desired to prevent. It is preferably bisectional, although it is formed of a plurality of sections which may vary in number in different embodiments of my invention, but for ordinary use with gas pipes running to gas meters, it is found that two sections are sufficient.

The sections are all alike and are preferably stamped from thin or sheet metal with the same die. Being exactly alike they are reversed in position when two are applied together and secured to each other so that the interlocking features may properly function and a complete casing provided. Each section is semicylindrical in form and has a semi-circular or peripheral wall portion preferably curved and lying in the arc of a circle, the diameter of which is slightly greater than that of the nut, pipe union, or other member A to be protected. Obviously when there are only two sections, the wall of each section is substantially cylindrical including the semicircular ring or band portion 1 shaped with two opposed integral end wall portions in the form of inwardly directed integral flanges 2, 2, said flanges surrounding a semicircular central opening 3 of greater or less size, so that when the sections are assembled there are two side (or a top and bottom) openings into the interior of the casing in axial alinement with each other. The openings 3, or one of them, when only one is needed, are made of a diameter slightly larger than the pipes, as $a$, rods, or other elements, leading to the nut, coupling, or the like, and may of course be of different diameters, depending upon the diameter of the said pipes, etc. These pipes $a$ belong to a gas meter or some other device.

In order to secure the two sections firmly together, the said sections at the extremities of their peripheral semicylindrical walls are provided with flanges 4 and 5, extending outwardly substantially radial, each section having one flange 4 and one flange 5, and the two flanges 4 and 5 on each section being located in substantially the same plane. When the sections are assembled these flanges 4 and 5 abut together, the flanges 4 on one section abutting against the flanges 5 on the other section at each end of the sections. Each of the housing sections with the flanges is formed in the die with a series of struck out loops that are curved or substantially semicircular, the alternate loops extending in opposite directions above and below or on one side and the other of the flat face of each flange so that the various loops on each flange constitute together a round bore or passage through which the wire or cord 15 is passed, and when the flanges 4 and 5 are brought closely together and the loops interlocked a round or circular wire-receiving passage of greater or less diameter is created having double walls, because at each point two loops are in contact. Beyond the line of its loops the outer edges 7 and 8 of the flanges 4 and 5 extend for a greater or less width. The formation and location of the loops on flanges 4 differs from that on the other flanges 5 to facilitate the interlocking of the loops on these flanges when the sections are assembled and the flanges caused to abut together; and when so interlocked the loops of flange 4 engage and coincide with the loops of the companion flange 5, to form interlocking members to hold the wire, pin or cord.

Thus each flange 4 is formed with a series of semicircular loops 9 projecting in one direction toward the center of the integral band 1 and a series of intervening loops 9a projecting in the opposite direction, all the loops being in a straight line, and outside the line of loops 9 and 9a there is an edge flange 7 in the same plane as flange 4. Also each flange 5 is formed with a series of semi-circular loops 10 projecting in one direction toward the center of the integral band 1 and a second series of intervening loops 10a projecting in the opposite direction, all these loops 10a being in line, and outside the line of loops 10 and 10a there is an edge flange 8 which is bent at an incline or angle to the plane of the rest of flange 5, and flange 5 is wider than flange 4 to permit of this bent flange 8 being wider than flange 7 which flange 7 is adapted to ride on flages 8 when the sections are opened on wire 15 as shown in Figure 5 at the time the sections are being opened to embrace a nut or other device. The size or diameter of the various loops may vary and may be proportioned to the diameter of the wire 15, thus giving the parts more or less play. In this case the wire 15 at this time acts as a pin or pintle in a passage and the device functions with a hinge for the two sections to open to embrace a coupling.

When the two semicylindrical sections of the housing are placed around the nut A or other object belonging to a pipe union or coupling, to enclose and protect the same, and prevent improper tampering, as shown in Figure 1, it will often be found convenient to cause two of the flanges 4 and 5 and their loops to be engaged and the wire 15 passed through them so that a hinge may be thus provided at one end of the housing which can then be opened up as shown in Figure 5 so that the housing when in this open condition may be brought around and over nut A; and then the two sections of the housing may be brought closely together at the other end, so that both pairs of looped flanges thereat may have their members in contact as shown in Figures 5, 6, and 1 and 2, after which the wire 15 may be passed through the loops on the second pair of flanges. After this the two free ends of the wire 15 will be sealed together by a lead or other seal 6, thus insuring the protection of the pipe union.

In thus engaging the loops it will be seen that the loops 9a enter the loops 10, and the loops 10a enter the loops 9, the loops 10a being intermediate of loops 9a and loops 9a being a double thickness. When the wire engages the loops as shown in Figure 5 the flaring flange 8 allows the flange 7 to open over it like a leaf turning on the pivot wire 15 and this enables the housing sections to open as shown so that the opening 3 is made big enough to go around and over the nut A, after which both flanged ends are locked together.

The number and exact shape of the various loops 9 and 9a and 10 and 10a may vary greatly, being few or many. They may be placed in a row lengthwise of the flanges or otherwise, as crosswise, or in a horizontal instead of a vertical line, and then may engage double or single. Obviously when flanges 4 and 5 are in contact all the loops 9a on flange 4 will lie in loops 10 on flange 5 and all loops 10a will lie in loops 9 on flange 4, so that the walls of the wire-holding passages are thus double walls and strong to hold the wire without breaking. However, the loops may be struck out in a different way if desired and engaged differently provided the sealing wire may be passed through them and properly sealed to prevent access to the nut.

Obviously many changes and variations in the details of many parts may be made without exceeding the scope of the invention as defined in the ensuing claims, and I therefore reserve the liberty of making all such changes as may be desirable, especially with reference to the number, size, shape, single or double ply character of loops, material and relative position and size of all the struck out parts and the way in which the die produces these parts for mutual engagement and interlocking.

What I claim is:

1. In a pipe union housing, the combination with a union or coupling, of a sectional housing, whose sections are provided with abutting flanges, said flanges having each a series of integral loops, the loops on one flange engaging the loops on the abutting flange, said flanges having their outer edges widened outside the line of the loops to permit one outer edge to ride on an adjacent outer edge when the sections are opened on the wire as a hinge in order to enable the housing to embrace a nut or other device, a wire passing through the engaging loops of the flanges, and means for sealing the ends of the wire.

2. In a pipe union housing, of the character described, the combination with a union or coupling, of a sectional housing whose sections are semicylindrical and provided at each end with substantially radial flanges, said flanges each having a series of loops struck out in one direction and a series of intervening loops struck out in the opposite direction, the loops on one flange interlocking with the loops on the abutting flange, and all the loops on each pair of flanges forming a passage, said flanges having their outer edges widened outside the line of the loops to permit one outer edge to ride on an adjacent outer edge when the sections are opened on the means passing through the passages as a hinge in order to enable the housing to embrace a nut or other device, said widened outside portions of each pair of flanges flaring in relation to each other so as to occupy a position at an angle to each other, together with means passing through said passages to hold the sections together, and sealing means for the latter means.

3. In a pipe union housing, a bi-sectional enclosure for a pipe union or the like, whose sections are provided with flanges at each end adapted to abut against each other, said flanges each having a series of loops struck out in one direction and a series of intervening loops struck out in the opposite direction, the loops on the flange of one section interlocking with the loops on the companion flange on the other section, and all the loops of each pair of flanges forming a passage, said flanges having their outer edges widened outside the line of the loops to permit one outer edge to ride on an adjacent outer edge when the sections are opened on the flexible means passing through the passages to serve as hinges in order to enable the housing to embrace a nut or other device, and flexible means passing through said passages to unite the sections of the housing closely to each other.

In testimony whereof I hereunto affix my signature.

EMIL DIETZE.